March 17, 1925.
A. W. MURRAY
1,530,195
PACKING FOR PISTONS
Filed Sept. 4, 1924
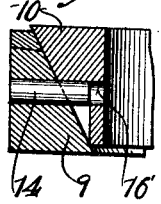
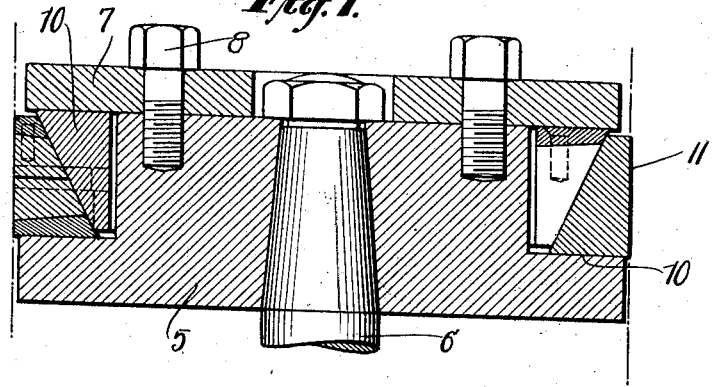
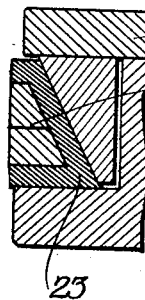
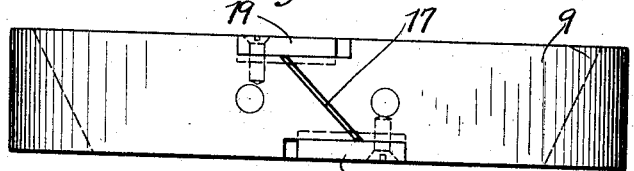
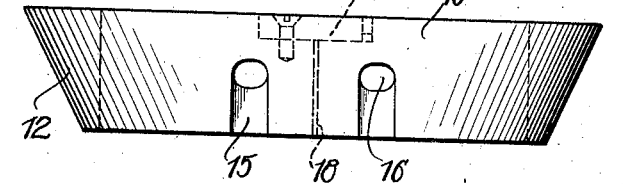
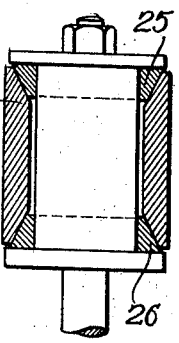
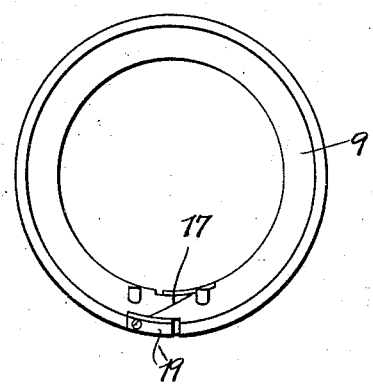
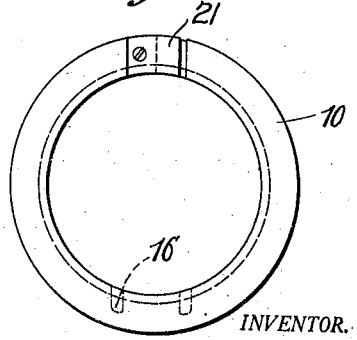
INVENTOR.
ALBERT W. MURRAY.
BY Richard B. Owen.
ATTORNEY.

Patented Mar. 17, 1925.

1,530,195

UNITED STATES PATENT OFFICE.

ALBERT W. MURRAY, OF BROOKLYN, NEW YORK.

PACKING FOR PISTONS.

Application filed September 4, 1924. Serial No. 735,905.

*To all whom it may concern:*

Be it known that I, ALBERT W. MURRAY, a citizen of the United States, residing at Brooklyn, in the county of Kings and State of New York, have invented certain new and useful Improvements in Packings for Pistons, of which the following is a specification.

This invention relates to piston rings for internal combustion engines and more particularly to a novel and improved construction applicable to pistons generally.

One of the objects of my invention is to provide a pair of interfitting wedged rings which may be locked together and yet allow for sufficient expansion to properly fit the piston ring groove.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a cross section view through the piston showing the rings in position.

Figure 1ª is an enlarged sectional view showing the locking pin with respect to the ring.

Figure 2 is a side view of the outer ring.

Figure 3 is a side view of the inner ring.

Figure 4 is a plan view of the outer ring.

Figure 5 is a plan view of the inner ring.

Figure 6 is an enlarged, sectional view showing a modified form of a connecting plate for the outer ring.

Figure 7 is a modified form of piston rings.

Referring now to the drawings, wherein like reference characters designate corresponding parts throughout the several views, 5 designates a piston and 6 a piston rod, to which a follower ring 7 is connected, the said ring being attached to the piston by threaded bolt 8 as clearly shown by Figure 1 of the drawings. The piston is provided with the usual piston ring groove as will be clearly seen from the figures of the drawings. My invention is directed to the piston ring structure now to be described in detail.

An outer ring 9 of substantial width tapering from the top to the bottom and on the inner side thereof, forms a seat for a second ring 10. It will thus be seen that the face of the outer ring is seated in the piston ring groove and the straight wall 11 thereof may engage the cylinder wall, which is shown in dotted lines, see Figure 1. The inner ring 10 is also wedged shaped to interfit the outer ring 9 and to that end, it will be seen that the outer wall 12 is of the same angularity as the inner wall of the ring 9. The outer ring 9 is provided with a pair of studs or pins 14 which are adapted to ride in the slot 15 of the inner ring and be seated in the apertures 16 thereof so as to lock the two rings together. The outer ring 9 is split as indicated at 17 at a substantially 45° angle and the inner ring is split vertically as indicated at 18 so as to permit the proper expansion of the respective rings when seated in the piston ring groove. In order to prevent the passage of gas and to retain the proper compression in the cylinder, I provide a pair of plates 19, 20, countersunk within the top and bottom of the ring 9 at the split portion 17, the said plates being secured by countersunk screws or other fastening means as clearly shown by Figure 2. In Figure 3 I have also shown a similar plate 21 which prevents the passage of gas through the split portion of the ring when it is positioned.

In Figure 6 it will be observed that a slight modification of the arrangement shown in Figures 2 and 3 and particularly the plates above referred to. In this form of the invention, a wedged shaped plate 23 is provided which is shaped to conform to the surface of the inner and outer rings and prevent the passage of the gas through the split portion 24 in the same manner as heretofore described.

In Figure 7 the outer ring 24 is in the form of a trapezoid when considered in cross section and interfits with a top and bottom bevelled ring 25, 26, which cooperate in the same manner as the interfitting rings 9 and 10 above referred to. In the form of the invention shown, however, and as described in connection with Figures 1 to 3 inclusive, this is the preferred form of the invention and to which the claim is now directed.

Having thus described my invention, what I claim as new and desire to secure by United States Letters Patent is:—

A piston ring comprising an outer and an inner interfitting annular member, each member being wedge shaped in cross section and split at opposite sides, horizontal locking pins on opposite sides of the split portion of the outer member, said inner member having vertical slots on opposite sides of the split portion to receive said locking pins and countersunk plates at the top and bottom of the split portion of the outer member.

In testimony whereof I affix my signature.

ALBERT W. MURRAY.